(12) United States Patent
Gong

(10) Patent No.: US 10,715,632 B2
(45) Date of Patent: Jul. 14, 2020

(54) SYSTEMS AND METHODS FOR PARALLEL AND SCALABLE PROCESSING OF TELEMETRY DATA FROM CONNECTED DISPENSING MACHINES

(71) Applicant: PepsiCo, Inc., Purchase, NY (US)

(72) Inventor: George Xu Gong, Purchase, NY (US)

(73) Assignee: PepsiCo, Inc., Purchase, NY (US)

( * ) Notice: Subject to any disclaimer, the term of this patent is extended or adjusted under 35 U.S.C. 154(b) by 903 days.

(21) Appl. No.: 15/165,932

(22) Filed: May 26, 2016

(65) Prior Publication Data

US 2017/0346923 A1 Nov. 30, 2017

(51) Int. Cl.
*G06F 15/16* (2006.01)
*H04L 29/08* (2006.01)
*B67D 1/08* (2006.01)

(52) U.S. Cl.
CPC .......... *H04L 67/327* (2013.01); *B67D 1/0888* (2013.01); *H04L 67/02* (2013.01); *H04L 67/1023* (2013.01); *H04L 67/16* (2013.01); *B67D 2210/00083* (2013.01); *B67D 2210/00089* (2013.01); *H04L 67/12* (2013.01)

(58) Field of Classification Search
CPC . H04L 67/125; H04L 67/025; H04L 67/1547; H04L 67/023; H04L 67/16; C04F 9/46
See application file for complete search history.

(56) References Cited

U.S. PATENT DOCUMENTS

| | | | |
|---|---|---|---|
| 5,608,643 A | 3/1997 | Wichter et al. | |
| 8,126,764 B2 | 2/2012 | Murray et al. | |
| 8,504,691 B1 * | 8/2013 | Tobler | H04L 67/02 370/229 |
| 8,566,833 B1 | 10/2013 | Biswas et al. | |
| 9,117,010 B2 | 8/2015 | Feldman et al. | |
| 2004/0068346 A1 | 4/2004 | Boucher | |
| 2010/0268791 A1 * | 10/2010 | Arimilli | G06F 9/542 709/217 |

(Continued)

OTHER PUBLICATIONS

International Search Report and Written Opinion dated Jul. 17, 2017, received in International Patent Application No. PCT/US17/30128, filed Apr. 28, 2017.

*Primary Examiner* — Thanh T Nguyen

(74) *Attorney, Agent, or Firm* — Sterne, Kessler, Goldstein & Fox P.L.L.C.

(57) ABSTRACT

The present disclosure is directed to systems and methods for parallel and scalable processing of messages containing telemetry data at an administrator system. The administrator system can receive a large number of messages containing telemetry data from many dispenser machines in a short amount of time. To receive and process those messages, the systems and methods of the present disclosure provide a message queuer to queue the messages (or at least the telemetry data in the messages) in a plurality of queues and a different thread or process for each of the plurality of queues. Each thread or process can pull messages out of its assigned queue in order and process the telemetry data of the messages. The threads or processes can run on one or more central processing unit cores at the administrator system. This setup allows for horizontal scaling in terms of message processing throughput.

19 Claims, 10 Drawing Sheets

(56) References Cited

U.S. PATENT DOCUMENTS

| | | |
|---|---|---|
| 2014/0373020 A1 | 12/2014 | Govindarajeswaran et al. |
| 2015/0019009 A1* | 1/2015 | Feldman ............ G06F 19/32 |
| | | 700/237 |
| 2015/0315008 A1* | 11/2015 | Locke ............ B67D 1/0857 |
| | | 222/52 |

* cited by examiner

SYSTEMS AND METHODS FOR PARALLEL AND SCALABLE PROCESSING OF TELEMETRY DATA FROM CONNECTED DISPENSING MACHINES

TECHNICAL FIELD

The described embodiments generally relate to connected machines, including connected dispensing machines.

BACKGROUND

Beverage dispensers are used to dispense beverages to customers at various locations, such as restaurants, cafeterias, theatres, and other entertainment and/or food service venues. Traditional beverage dispensers provide a limited number of beverage types the can be dispensed (e.g., between six and ten) and offer no advanced features. Newer beverage dispensers can provide a substantially larger number of beverage types and combinations due in large part to the fact that these dispensers are no longer mechanically confined to providing one or two beverage types per dispensing head. For example, newer beverage dispensers can use a single dispensing head to provide up to 1000 different beverage types and combinations.

A combination refers to a mixture of offered beverage types that can be automatically mixed and dispensed from a single dispensing head and represents one advanced feature offered by newer beverage dispensers. A dispensed combination can be, for example, a personal combination of offered beverage types selected by a customer at the beverage dispenser or one of a number of predefined combinations available to a customer to choose from at the beverage dispenser.

With increased sophistication in terms of the number of beverage choices available and other innovative features, it can be desirable for venue owners and/or operators to connect advanced beverage dispensers to an administrator system over a computer network to allow the advanced beverage dispensers to provide telemetry data to the administrator system. Telemetry data can include, for example, data collected at the advanced beverage dispensers related to consumption (e.g., amount of each beverage type and combination consumed at the advanced beverage dispensers) and status (e.g., current amount of ingredients and/or supplies at the advanced beverage dispensers). The administrator system can use the telemetry data to improve, for example, the operation, maintenance, and/or overall logistics associated with running the advanced beverage dispensers.

In addition, it can be further desirable to connect other types of dispenser machines, such as those that dispense canned/bottled beverages, snacks, and/or other items, to an administrator system over a computer network for the same reasons. These dispenser machines are often referred to as vending machines.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. The drawing in which an element first appears is typically indicated by the leftmost digit(s) in the corresponding reference number.

DETAILED DESCRIPTION

Figure 1:
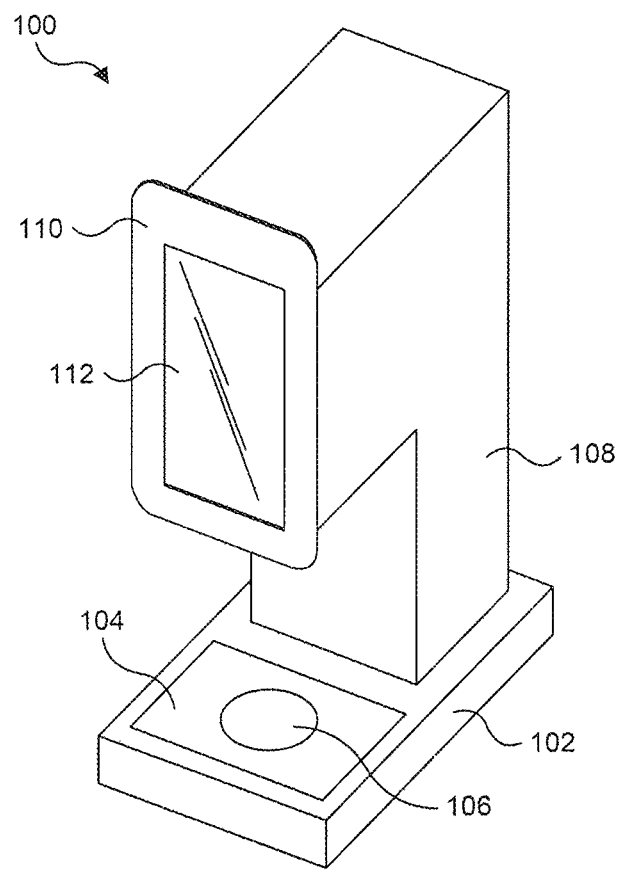
FIG. 1 is a front perspective view of a beverage dispenser according to an embodiment of the present disclosure.

The present disclosure will now be described in detail with reference to embodiments thereof as illustrated in the accompanying drawings. References to "one embodiment", "an embodiment", "an exemplary embodiment", etc., indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

1. OVERVIEW

To allow a dispenser machine to provide telemetry data to an administrator system over a computer network, the administrator system can expose a web service to the dispenser machine. A web service is a messaging framework that is capable of exchanging messages over a computer network between a client and a server using internet technologies, such as Hypertext Transfer Protocol (HTTP), Extensible Markup Language (XML), and JavaScript Object Notation (JSON). In general, two types of messages are exchanged: request messages and response messages. The client sends a request message over the computer network to the server exposing the web service. The request message encodes arguments and a request to perform an operation (or run a subroutine) at the server with the arguments. After performing the operation with the arguments, the host can return a response message over the computer network to the client with the result of the operation.

Web services have a layered architecture and typically include, from lowest to highest, at least a network layer, a transport layer, and a packaging layer. The network layer specifies the most basic communication needs of the web service, such as how data should be addressed, transmitted, and routed over the computer network. The transport layer is responsible for enabling application-to-application communication on top of the network layer and includes, for example, technologies such as HTTP. The packaging layer specifies the format data is to be packaged in before being transmitted over the network by the transport layer. Simple Object Access Protocol (SOAP) and REpresentational State Transfer (REST) are two of the most common packaging formats. SOAP defines an XML-based envelope for constructing the request and response messages described above. REST can use a wide variety of machine readable formats as an envelope for constructing the request and response messages, including XML and JSON.

The layers of the web-service architecture do not specifically address security concerns, such as message integrity, authentication, authorization, and confidentiality. Consequently, exposing a web service that offers a dispenser machine access to an administrator system over a computer network may undesirably offer other, non-authorized users and devices of the computer network access to the administrator system and the web service messages.

The present disclosure is directed to systems and methods for securely providing telemetry data of a dispenser machine to an administrator system via an exposed web service over a computer network. To secure the exposed web service, the systems and methods of the present disclosure provide secure gateways at the dispenser machine and the administrator system that can provide one or more of message integrity, authentication, authorization, and confidentiality. The secure gateways are implemented separate from the applications creating the request and response messages at the dispenser machine and the administrator system, respectively. Because the secure gateways are implemented separate from the applications creating the request and response messages, the applications creating the request and response messages can be created and modified without consideration to message security, which can be handled transparently by the secure gateways.

The present disclosure is further directed to systems and methods for parallel and scalable processing of web service messages containing telemetry data at an administrator system. The administrator system can receive a large number of web service messages containing telemetry data from many dispenser machines in a short amount of time. To receive and process those web service messages, the systems and methods of the present disclosure provide a message queuer to queue the web service messages (or at least the telemetry data in the web service messages) in a plurality of queues and a different thread or process ("thread") for each of the plurality of queues. Each thread can pull web service messages out of its assigned queue in the order they are stored within the assigned queue and process the telemetry data of the web service messages. The threads can run on one or more central processing unit (CPU) cores at the administrator system. This setup allows for horizontal scaling in terms of web service message processing throughput. For example, to increase web service message processing throughput, the number of CPU cores can be increased and/or the number of queues (and, correspondingly, number of threads assigned to the queues) can be increased.

The systems and methods for parallel and scalable processing of web service messages containing telemetry data at the administrator system can further ensure that the web service messages are processed in the order in which they are generated at their respective dispenser machines. This may be useful, for example, to ensure decisions related to the maintenance and operation of the dispenser machines are not being made based on old telemetry data.

To provide such ordered web service message processing functionality, the message queuer can place a web service message containing telemetry data into one of the plurality of queues based on the dispenser machine from which the web service message was received. For example, the message queuer can use a dispenser machine identifier included in the web service message to map the web service message to a particular one of the plurality of queues such that web service messages from the dispenser machine are placed in the same queue. In addition, once the message queuer has determined a particular one of the plurality of queues in which to place a web service message, the message queuer can insert the web service message into a particular position of the queue based on when the web service message was generated at the dispenser machine. For example, the message queuer can use a web service message sequence number or time stamp included in the web service message to insert the web service message at a particular position in the queue such that the web service messages in the queue are stored in the order in which the web service messages were generated.

Before further describing these and other features of the present disclosure, an exemplary operating environment in which embodiments of the present disclosure can operate is provided in the following section.

2. EXEMPLARY OPERATING ENVIRONMENT

FIG. 1 shows a dispenser 100 in which embodiments of the present disclosure can be implemented. Dispenser 100 can include a base 102 coupled to a body 108. Base 102 can serve to support body 108 in an upright position. Base 102 can include a drip tray 104 with a dispense location 106 located within the area occupied by drip tray 104. A user (e.g., a customer) can place his or her cup at dispense location 106 to receive his or her desired beverage.

Body 108 can include a user interface 110 for receiving commands from a user. User interface 110 can include a display screen 112 configured to display information to a user and/or receive commands from a user. Display screen 112 can be a touch screen, such as a liquid crystal display (LCD) touchscreen or a light emitting diode (LED) touchscreen. A user can initiate the dispensing of a beverage, e.g., by interacting with user interface 110 to make a selection of his or her desired beverage to be dispensed by dispenser 100.

Figure 2:
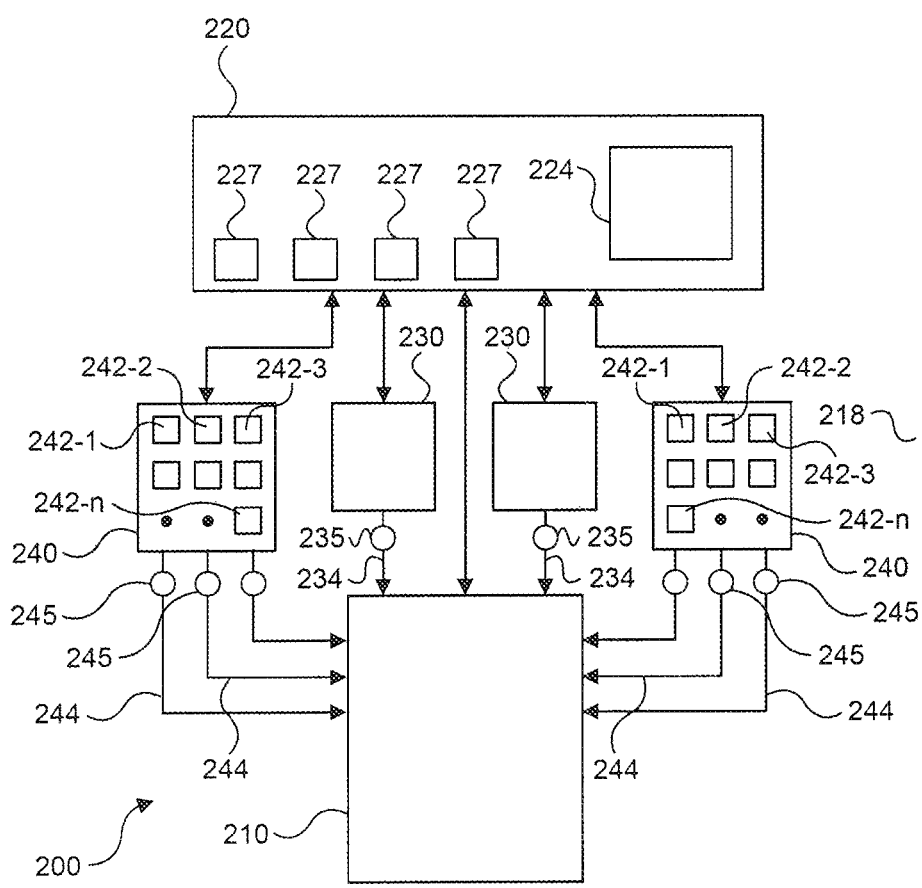
FIG. 2 is a block diagram of a beverage dispenser according to an embodiment of the present disclosure.

FIG. 2 shows a block diagram 200 of components of a dispenser, such as dispenser 100 in FIG. 1, according to embodiments of the present disclosure. Block diagram 200 can include a dispensing manifold 210, such as one of the vertical dispensing manifolds described in U.S. patent application Ser. No. 15/016,466, filed Feb. 5, 2016, which is incorporated herein by reference in its entirety.

Block diagram 200 can include one or more base liquid sources 230. Base liquid sources 230 can be, but are not limited to, a tap water source (e.g., tap water line) and a carbonated water source (e.g., carbonated water reservoir or carbonator). Base liquid sources 230 can be coupled to dispensing manifold 210 via base liquid delivery tubes 234. Valves/pumps 235 in communication with base liquid delivery tubes 234 can be configured to control the flow of base liquid through base liquid delivery tubes 234 and into dispensing manifold 210.

Block diagram 200 can include one or more ingredient sources 240. Ingredient sources 240 can include a plurality of ingredients 242 (242-1 through 242-n). Ingredients 242 can include liquid ingredients, such as but not limited to, sweeteners (e.g., sugars or artificial sweeteners), syrups, or flavorings (e.g., cola syrups or flavorings, brand soda syrups or flavoring (e.g., Mountain Dew® or Sierra Mist®), orange flavoring, lime flavoring, cherry flavoring, tea flavorings, etc.), or other liquid additives (e.g., vitamins, acids (e.g., citric acid), salts, or colorings). Ingredients 242 can be packaged within a container, such as but not limited to a cartridge or bag. Each ingredient 242 can be delivered to dispenser 210 via ingredient delivery tubes 244. Valves/pumps 245 in communication with ingredient delivery tubes 244 can be configured to control the flow of ingredients through ingredient tubes 244 and into dispensing manifold 210.

A dispenser controller 220 can be configured to control and receive commands from a user interface, such as user interface 110 in FIG. 1. Dispenser controller 220 can be configured to control operations of the dispenser represented by block diagram 200 based on, for example, commands received from the user interface. For example, dispenser controller 220 can control the dispensing of a beverage type or combination, both of which can be a mixture of a base liquid and one more ingredients 242 from dispensing manifold 210. Dispenser controller 220 can control the flow of a base liquid from base liquid sources 230 by controlling valve/pumps 235. Dispenser controller 220 can also control the flow of ingredients 242 from ingredient sources 240 by controlling valves/pumps 245. By controlling valves/pumps 245, dispenser controller 220 can control the pressure of an ingredient 242 within ingredient tubes 244.

In some embodiments, dispenser controller 220 can include and/or can be configured to read sensors 227. Sensors 227 can include pressure sensors for monitoring the pressure of a base liquid within a base liquid delivery tube 234 and/or for monitoring the pressure of an ingredient within an ingredient delivery tube 244. Sensors 227 can also include flow sensors (e.g., flow meters) for measuring the flow of base liquids and ingredients within delivery tubes 234 and 244, respectively, and/or for measuring the degree of uniform flow within dispensing manifold 210. In some embodiments, sensors 227 can include level sensors for measuring the amount of each ingredient 242 remaining within an ingredient source 240.

Sensors 227 can also include, but are not limited to sensors configured to monitor (1) carbon dioxide tank levels (e.g., one, two, or more carbon dioxide regulators); (2) carbonization head pressure of a carbonator configured to carbonate water; (3) ambient temperature of a room (e.g., a backroom) in which base liquids and/or ingredients 242 are stored (thereby monitoring whether one or more base liquids and/or ingredients 242 are maintained at pre-determined temperature level or within a pre-determined temperature range); (4) water filtration system parameters (e.g., water pressure, differential pressure on filters) associated with the base liquids; (5) pH of water or carbonated water associated with the base liquids; (6) the expiration date of an ingredient container (e.g., by reading a bar code associated within an ingredient container) in which one of ingredients 242 is contained. Sensors 227 can be configured to transmit signals over a wired or wireless network to dispenser controller 220. Dispenser controller 220 can be configured to control the operations of the dispenser represented by block diagram 200 based on data (e.g., pressure and flow values) collected by sensors 227.

In some embodiments, dispenser controller 220 can further include an embedded computer 224. In some embodiments, embedded computer 224 can collect dispenser telemetry data including: (1) amounts of beverage types and combinations dispensed by dispensing manifold 210, (2) amounts of ingredients 242 remaining in ingredient sources 240, (3) user identification codes collected from a user interface of the dispenser machine, and (4) other data from sensors 227 mentioned above (e.g., flow data, ambient temperature of room where base liquids and/or ingredients 242 are stored, carbon dioxide tank levels, carbonization head pressure, water filtration system parameters, etc.). In some embodiments, embedded computer 224 can store the dispenser telemetry data and send the dispenser telemetry data to a controller of an administrator system over a computer network, such as the internet. The administration controller can be provided and/or managed by the operator of the dispenser represented by block diagram 200 or some other entity associated with the operation of the dispenser represented by block diagram 200.

In some embodiments, all or part of the stored telemetry data (e.g., the information related to the amounts of beverage types and combinations dispensed by dispensing manifold 210) can be periodically sent to the administrator controller. In some embodiments, all or part of the stored telemetry data (e.g., the other data from sensors 227 mentioned above) can be sent to the administrator controller based on alert levels or threshold levels associated with the stored telemetry data. For example, the stored telemetry data related to the ambient temperature of the room where the base liquids and/or ingredients 242 are stored can be sent to the administration controller when the ambient temperature of the room passes a certain predetermined threshold that is outside or nearly outside an acceptable temperature range. In another example, the stored telemetry data related to the carbon dioxide tank levels can be sent to the administrator controller when the carbon dioxide tank levels pass a certain predetermined threshold indicating that the carbon dioxide tank levels are low or empty.

In some embodiments, the administrator controller can use the telemetry data to aid in the distribution of ingredients to the dispenser represented by block diagram 200 and/or in the maintenance of the dispenser represented by block diagram 200. In some embodiments, the administrator controller can use the telemetry data to track user preferences and consumption data (e.g., types and amounts of beverages dispensed by manifold 210), which can be analyzed to predict consumer trends and/or to support future business decisions as they relate to the dispenser represented by block diagram 200. In other embodiments, the administrator controller can use the telemetry data to improve the dispenser machine maintenance task, customer satisfaction, and/or predict parts failure in the dispenser machine and/or schedule preventative maintenance services of the dispenser machine.

3. SECURE GATEWAYS

To enable a dispenser machine to provide telemetry data to a controller of an administrator system over a computer network, the administrator controller can expose a web service to the dispenser machine. As discussed above, a web service is a messaging framework that is capable of exchanging messages over a computer network between a client and a server using internet technologies, such as Hypertext Transfer Protocol (HTTP), Extensible Markup Language (XML), and JavaScript Object Notation (JSON). In general, two types of messages are exchanged: request messages and response messages. The client sends a request message over the computer network to the server exposing the web service. The request message encodes arguments and a request to perform an operation (or run a subroutine) at the server with the arguments. After performing the operation with the arguments, the host can return a response message over the computer network to the client with the result of the operation.

Figure 3:
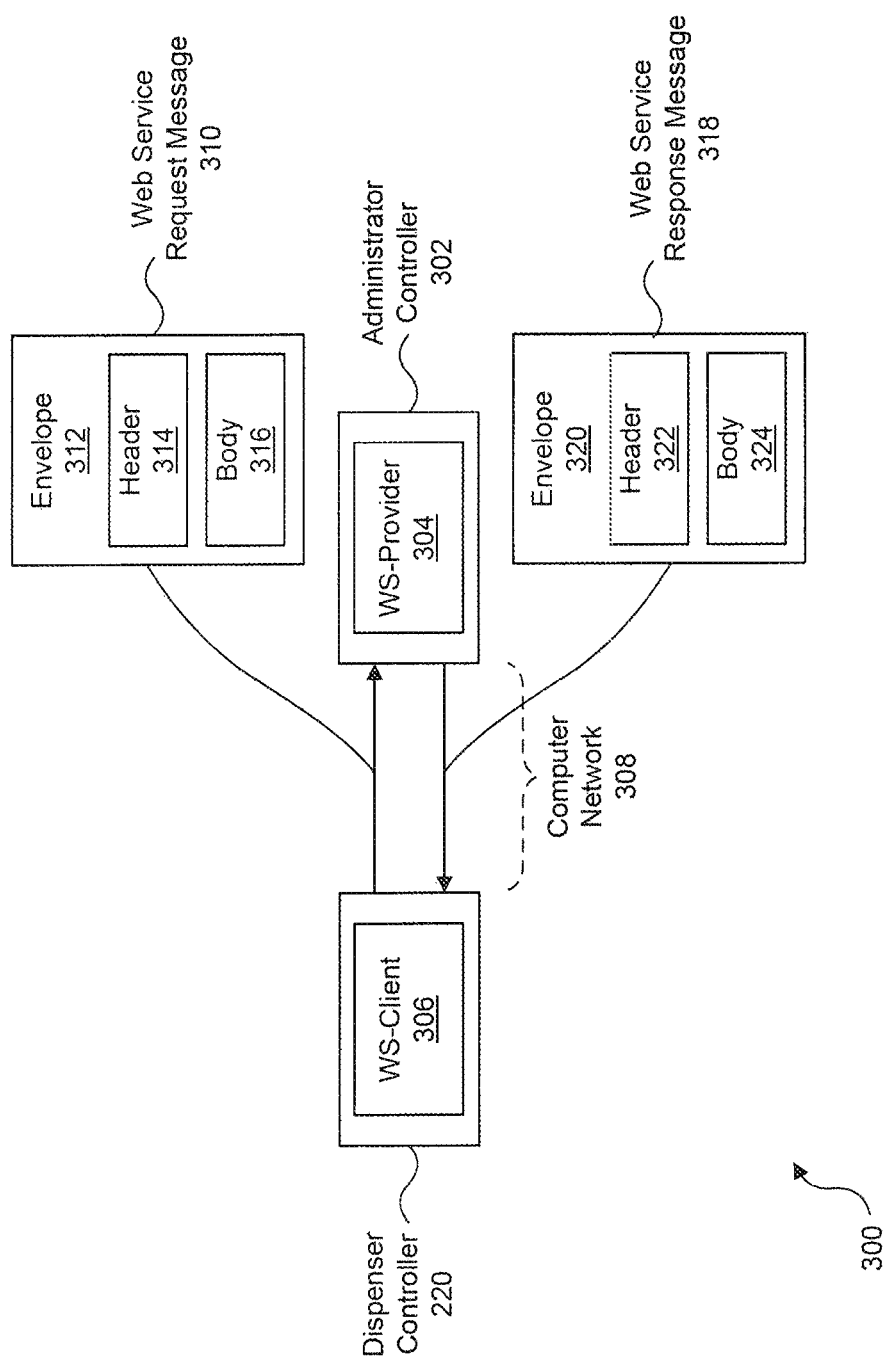
FIG. 3 is a system for providing telemetry data over a computer network according to an embodiment of the present disclosure.

FIG. 3 illustrates a system 300 for providing telemetry data over a computer network using an exposed web service according to an embodiment of the present disclosure. System 300 includes an administrator controller 302 and dispenser controller 220, which was described above in regard to FIG. 2. Dispenser controller 220 is provided by way of example and not limitation. Other dispenser controllers (e.g., dispenser controllers implemented in different dispenser machines) can be used in system 300 without departing from the scope and spirit of the present disclosure as would be appreciated by one of ordinary skill in the art.

In operation, a web service provider (WS-provider) 304 of administrator controller 302 exposes the web service that enables a web service client (WS-client) 306 of dispenser controller 220 to provide telemetry data to administrator controller 302 over a computer network 308, such as the internet. The telemetry data can include data collected from sensors 227, as described above in regard to FIG. 2, and other data collected from other sensors and/or peripherals of the dispenser machine in which dispenser controller 220 is implemented.

WS-client 306 can package the telemetry data in a web-service request message 310 that is formatted in accordance with Simple Object Access Protocol (SOAP), REpresentational State Transfer (REST), or some other packaging format. Web service request message 310 can include an envelope 312 containing an optional header 314 and a body 316. Header 314, when used, can include one or more blocks of information that specify how the message is to be processed by one or more receiving entities. Body 316 can include the telemetry data as one or more arguments and a request to perform an operation (or run a subroutine) at WS-provider 304 with the one or more arguments. The telemetry data and request to perform the operation can be expressed within body 316 in an XML or JSON syntax. The request to perform the operation can also be expressed outside body 316 in any number of forms, including as a uniform resource identifier (URI).

After WS-client 306 packages the telemetry data and request to perform the operation in web service request message 310, WS-client 306 can transmit web service request message 310 over computer network 308. In one embodiment, WS-client 306 transmits web service request message 310 over computer network 308 using HTTP or HTTP secure (HTTPS).

WS-provider 304 receives web-service request message 310 from WS-client 306 over computer network 308 and unpacks web service request message 310 to recover the one or more arguments that comprise the telemetry data and the request to perform the operation with the one or more arguments. WS-provider 304 subsequently performs the operation with the one or more arguments that comprise the telemetry data and, optionally, packages the result of the operation into a web service response message 318. The operation can include, for example, parsing the telemetry data and populating a database with the various values of the telemetry data. The data in the database can subsequently be used to aid in the distribution of ingredients to the dispenser machine and/or in the maintenance of the dispenser machine. In some embodiments, the data in the database can be used to track user preferences and consumption data (e.g., types and amounts of beverages dispensed by the dispenser machine), which can be analyzed to predict consumer trends and/or to support future business decisions as they relate to the dispenser machine. In other embodiments, the data in the database can be used to improve the dispenser machine maintenance task, customer satisfaction, and/or predict parts failure in the dispenser machine and/or schedule preventative maintenance services of the dispenser machine.

Similar to web service request message 310, WS-provider 304 can format web service response message 318 in accordance with SOAP, REST, or some other packaging format. Web service response message 318 can include an envelope 320 containing an optional header 322 and a body 324. Header 322, when used, can include one or more blocks of information that specify how the message is to be processed by one or more receiving entities. Body 324 can include the result of the operation. The result of the operation can be expressed within body 324 in an XML or JSON syntax.

After WS-provider 304 packages the result of the operation in web service response message 318, WS-provider 304 can transmit web service response message 318 over computer network 308. In one embodiment, WS-provider 304 transmits web service response message 318 over computer network 308 using HTTP or HTTPS.

It should be noted that multiple dispensers and dispenser controllers, other than dispenser controller 220, can transmit web service request messages to administrator controller 302. These web service request messages can be processed similar to web service request message 310 as described above but may include different data (e.g., other than telemetry data) and/or requests to perform different operations or subroutines.

One problem with the web service exposed by WS-provider 304 and web services in general is that the layered architecture of web services does not specifically address security concerns, such as message integrity, authentication, authorization, and confidentiality. Consequently, exposing a web service that offers dispenser controller 220 and other dispenser controllers access to administrator controller 302 over computer network 308 may undesirably offer other, non-authorized users and devices of computer network 308 access to administrator controller 302 and the web service request and response messages 310 and 318.

To secure the exposed web service, secure gateways can be provided at dispenser controller 220 and administrator controller 302 that can provide one or more of message integrity, authentication, authorization, and confidentiality. The secure gateways can be implemented separate from the applications creating the request and response messages at dispenser controller 220 and administrator controller 302, respectively; i.e., separate from WS-client 306 and WS-provider 304. Because the secure gateways are implemented separate from WS-client 306 and WS-provider 304, these applications can be created and modified without consideration to message security, which can be handled transparently by the secure gateways.

Figure 4:
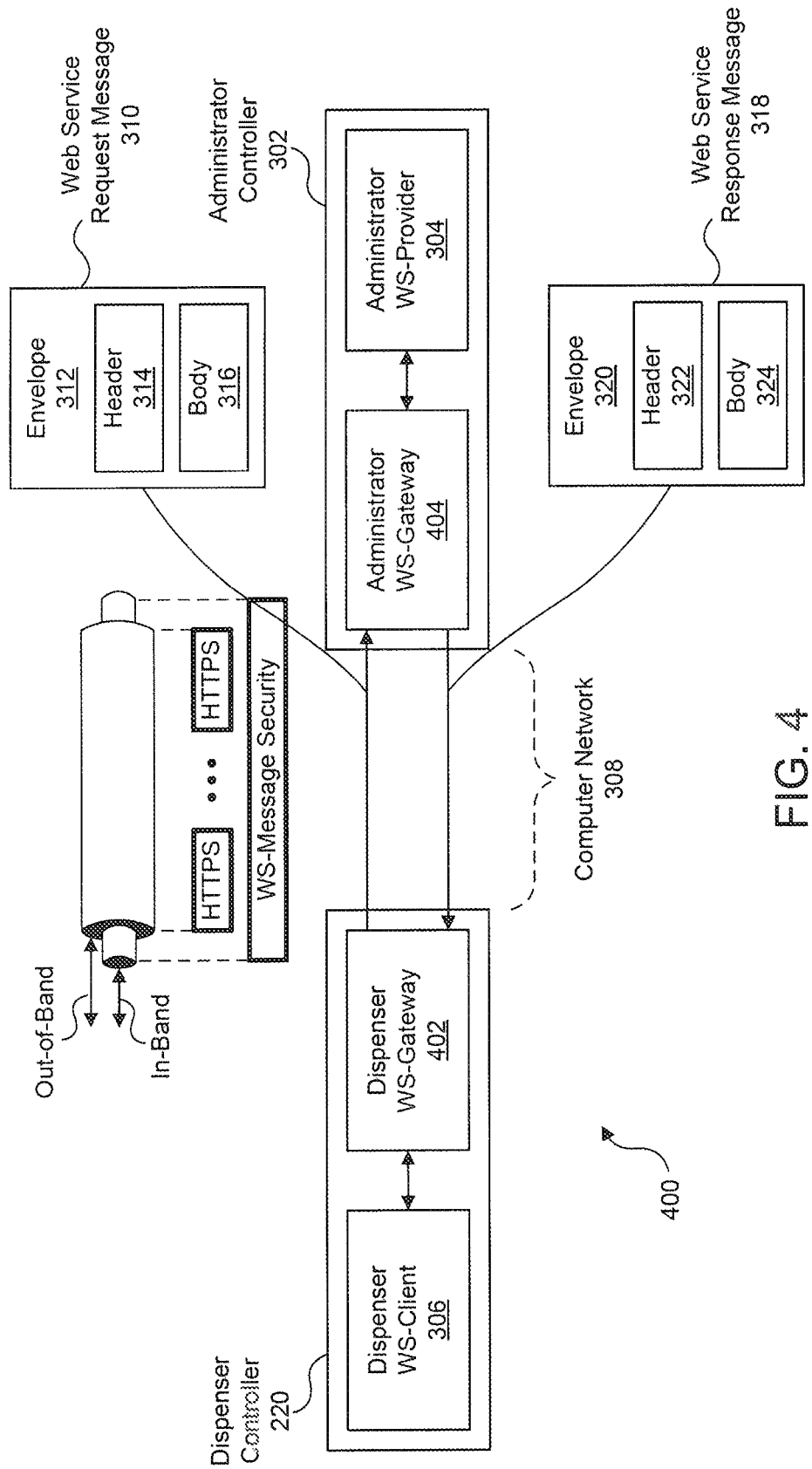
FIG. 4 is a system for securely providing telemetry data over a computer network according to an embodiment of the present disclosure.

FIG. 4 illustrates such a system 400 according to an embodiment of the present disclosure. In particular, system 400 has the same basic configuration and operates in the same basic manner as system 300 in FIG. 3 described above. However, dispenser controller 220 and administrator controller 302 in system 400 of FIG. 4 each further include a secure gateway. More specifically, dispenser controller 220 further includes a dispenser web service gateway (dispenser WS-gateway) 402 and administrator controller 302 further includes an administrator web service gateway (administrator WS-gateway) 404.

In operation, dispenser WS-gateway 402 is configured to intercept web service request message 310 generated by dispenser WS-client 306 before web service request message 310 is transmitted over computer network 308 to administrator controller 302. In one embodiment, WS-gateway 402 is implemented as an HTTP proxy server configured to intercept an HTTP request message containing web service request message 310 in the body of the HTTP request message.

Once dispenser WS-gateway 402 has intercepted web service request message 310, dispenser WS-gateway 402 can encrypt all, or at least a portion of, the telemetry data (or other data) in body 316 of web service request message 310 to generate a digital signature. Dispenser WS-gateway 402 can insert the digital signature into header 314 of web service request message 316. Administrator controller 302 can use the digital signature to authenticate the telemetry data (or at least the portion of the telemetry data and/or other data that was signed); i.e., prove that the telemetry data came from dispenser controller 220.

In one embodiment, dispenser WS-gateway 402 can encrypt all, or at least a portion of, the telemetry data (or other data) in body 316 of web service request message 316 using a private key associated with dispenser controller 220. The private key associated with dispenser controller 220 is part of an asymmetric key pair that includes the private key and a public key. The public key can be made public or kept secret by administrator controller 302, whereas the private key is kept secret by dispenser controller 220 and not distributed. Administrator controller 302 can use the public key associated with dispenser controller 220 to verify (e.g., through decryption) the digital signature. If the verification is successful, administrator controller 302 can be sure that the private key associated with dispenser controller 220 was used to encrypt the telemetry data used to generate the digital signature because data encrypted with the private key can only be decrypted with the public key.

In another embodiment, rather than encrypt the telemetry data directly, dispenser WS-gateway 402 can encrypt a message digest that results from a one way hash of the telemetry data using the private key associated with dispenser controller 220. The one way hash can be used to ensure the integrity of the telemetry data and/or reduce processing time required to generate the digital signature.

Once dispenser WS-gateway 402 has intercepted web service request message 306, dispenser WS-gateway 402 can further encrypt all, or at least a portion of, the telemetry data (or other data) in body 316 of web service request message 310 to ensure confidentiality of the telemetry data as it traverses computer network 308. After encrypting the telemetry data, dispenser WS-gateway 402 can re-insert the encrypted telemetry data into body 316 of web service request message 316.

In one embodiment, dispenser WS-gateway 402 can encrypt all, or at least a portion of, the telemetry data (or other data) in body 316 of web service request message 316 using a public key associated with administrator controller 302. Like the public key associated with dispenser controller 220, the public key associated with administrator controller 302 is part of an asymmetric key pair that includes the public key and a private key. The public key is made public and distributed freely, whereas the private key is kept secret by administrator controller 302 and not distributed.

In another embodiment, dispenser WS-gateway 402 can encrypt all, or at least a portion of, the telemetry data (or other data) in body 316 of web service request message 316 using a symmetric key. Dispenser WS-gateway 402 can encrypt the symmetric key with the public key associated with administrator controller 302 and insert the symmetric key in header 314 or body 316 of web service request message 310.

After dispenser WS-gateway 402 has inserted the digital signature and/or encrypted the telemetry data in body 316, dispenser WS-gateway 402 can transmit web service request message 310 over computer network 308 using, for example, HTTP or HTTPS. Administrator WS-gateway 404 is configured to receive web service request message 310 over computer network 308 and perform one or more of decrypting the telemetry data, authenticating the telemetry data, and determining whether dispenser controller 220 is authorized to perform the requested operation (or requested subroutine) in web service request message 310.

If the telemetry data (or other data) in body 316 of web service request message 310 was encrypted with the public key associated with administrator controller 302, administrator WS-gateway 404 can decrypt the encrypted telemetry data using the private key associated with administrator controller 302. If the telemetry data (or other data) in body 316 of web service request message 310 was encrypted with a symmetric key as described above, administrator WS-gateway 404 can obtain an encrypted copy of the symmetric key from header 314 or body 316 of web service request message 310, decrypt the symmetric key using the private key associated with administrator controller 302, and then use the decrypted symmetric key to decrypt the encrypted telemetry data. Once decrypted, administrator WS-gateway 404 can replace the encrypted telemetry data in web service request message 310 with the decrypted telemetry data.

If authentication is to be performed, administrator WS-gateway 404 can extract the digital signature in header 314 of web service request message 310 and decrypt the digital signature using the public key associated with dispenser controller 220. The telemetry data (or other data) that was signed to create the digital signature can then be compared to the telemetry data in body 316 of web service request message 310 to authenticate that the telemetry data came from dispenser controller 220. In the instance where dispenser WS-gateway 402 created the digital signature from a one way hash of the telemetry data (or other data) in body 316 of web service request message 310, administrator WS-gateway 404 can perform the same one way hash of the telemetry data in body 316 before comparing the telemetry data in body 316 to the decrypted digital signature.

If authorization is to be performed, administrator WS-gateway 404 can determine whether dispenser controller 220 is authorized to use the web service subroutine requested in web service request message 310. In one embodiment, administrator WS-gateway 404 can check a list of dispenser controllers and/or dispensers that are authorized to perform the requested operation in web service request message 310. If dispenser controller 220 or the dispenser in which dispenser controller 220 is implemented is on the list, administrator WS-gateway 404 can pass web service request message 310 to administrator WS-provider 304 for processing. On the other hand, if dispenser controller 220 or the dispenser in which dispenser controller 220 is implemented is not on the list, administrator WS-gateway 404 can discard web service request message 310, preventing web service request message 310 from being processed by administrator WS-provider 304.

In another embodiment, if authorization is to be performed, administrator WS-gateway 404 can determine whether a web service is published based on a configurable list of published web services. If not, the web service call of the non-published web service by a dispenser machine can be rejected and discarded. This mechanism protects any non-published web service and can be used to take a web service out of service at any time for whatever reason.

After receiving the web service request message 310 from administrator WS-gateway 404 (with any encrypted telemetry data in body 316 replaced with decrypted telemetry data), administrator controller 302 can process the web service request message 310 as described above in regard to FIG. 3. It should be noted that administrator WS-gateway 404 and dispenser WS-gateway 402 can each perform the functionality of the other gateway as described above to secure web service response message 318 similar to web service request message 310.

In one embodiment, not all web service request messages sent by dispenser controller 220 need to be signed and/or encrypted by dispenser WS-gateway 402. Such messages that are not signed and/or encrypted by dispenser WS-gateway 402 can be said to be sent "out-of-band," whereas messages that are signed and/or encrypted can be said to be sent "in-band".

For example, "heartbeat" messages can be generated by either dispenser WS-client 306 or dispenser WS-gateway 402 and sent to administrator controller 302 over computer network 308 out-of-band by dispenser WS-gateway 402. These heartbeat messages can be sent periodically or on a recurring basis to signal to administrator controller 302 that dispenser controller 220 (or the dispenser in which dispenser controller 220 is implemented) exists and is available.

Figure 5:
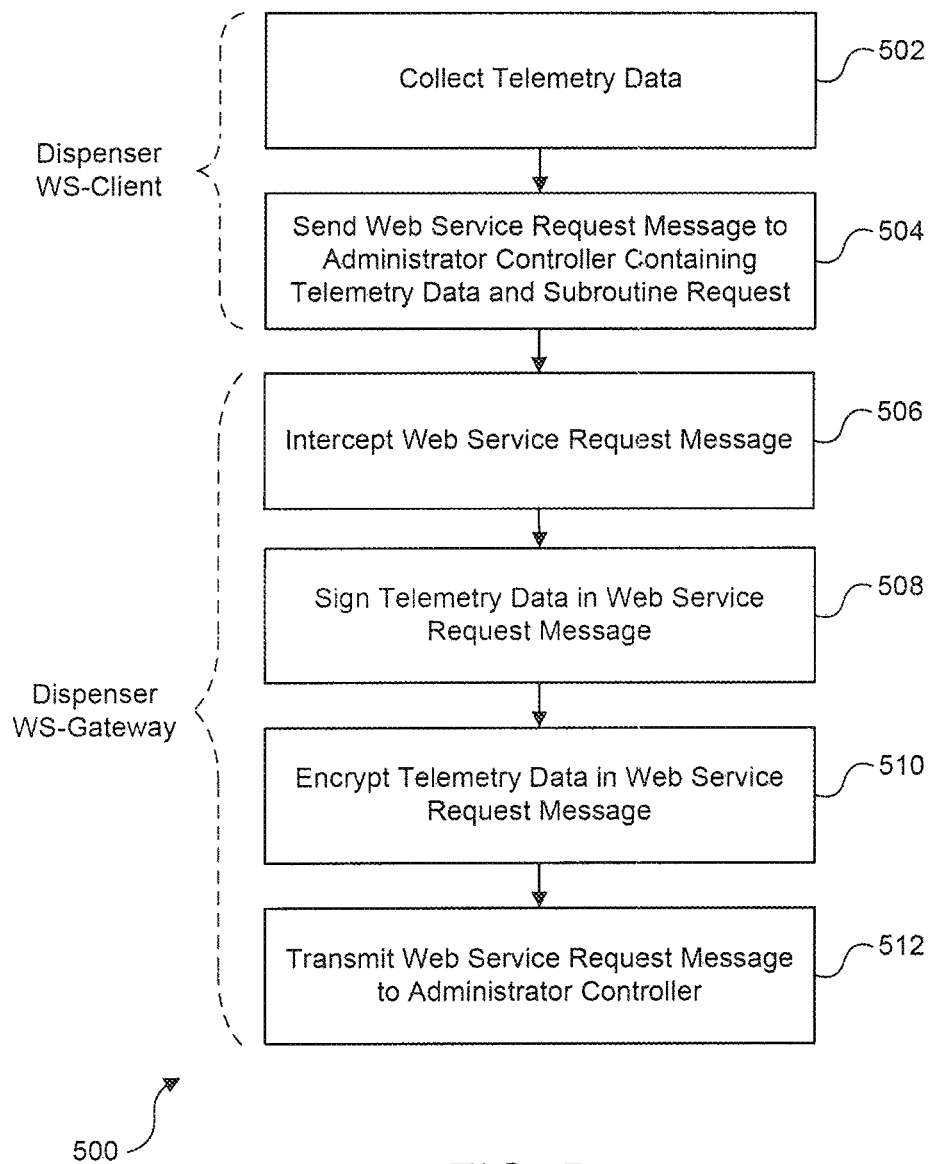
FIG. 5 is a flowchart of a method for collecting and securely transmitting a web service request message containing telemetry data to an administrator controller over a computer network according to an embodiment of the present disclosure.

Referring now to FIG. 5, a flowchart 500 of a method for collecting telemetry data and securely transmitting a web service request message containing the telemetry data from a dispenser machine to an administrator controller over a computer network according to an embodiment of the present disclosure is illustrated. The method of flowchart 500 can be implemented by dispenser WS-client 306 and dispenser WS-gateway 402 as described above and illustrated in FIG. 4. However, it should be noted that the method can be implemented by other dispenser WS-clients and dispenser WS-gateways as well. The steps of flowchart 500 performed by each of these applications are labeled in FIG. 5. It should be further noted that some of the steps of flowchart 500 do not have to occur in the order shown in FIG. 5.

The method of flowchart 500 begins at step 502. At step 502, telemetry data of the dispenser machine is collected. Telemetry data can include, for example, data collected at the dispenser machine related to consumption (e.g., amount of each item consumed at the dispenser machine) and status (e.g., current amount of ingredients, supplies, and/or items at the dispenser machine). The telemetry data can also include the specific types of data mentioned above with respect to FIG. 2.

After collecting the telemetry data at step 502, the method of flowchart 500 proceeds to step 504. At step 504, a web service request message is sent to the administrator controller, such as administrator controller 302 in FIG. 4, with the telemetry data and a request to perform an operation (or run a subroutine) with the telemetry data as an argument. The web service request message can be packaged in accordance with SOAP, REST, or some other packaging format. The web service request message can include an envelope containing an optional header and a body. The header, when used can include one or more blocks of information that specify how the message is to be processed by one or more receiving entities. The telemetry and the request to perform the operation can be expressed within the body in an XML or JSON syntax. The request to perform the operation can also be expressed outside the body.

After step 504, the method of flowchart 500 proceeds to step 506. At step 506, the web service request message is intercepted before being sent to the administrator controller over a computer network, such as the internet. An HTTP proxy can be used to intercept the web service request message.

After step 506, the method of flowchart 500 proceeds to step 508. At step 508, the telemetry data in the intercepted web service request message is optionally signed by encrypting the telemetry data or encrypting a one way hash of the telemetry data. The telemetry data or the one way hash of the telemetry data can be signed using a private key associated with the dispenser machine. The resulting digital signature can be inserted into a header of the web service request message.

After step 508, the method of flowchart 500 proceeds to step 510. At step 510, the telemetry data in the body of the web service request message is optionally encrypted. The telemetry data can be encrypted using a public key associated with the administrator controller or a symmetric key. If the symmetric key is used to encrypt the telemetry data, the symmetric key can be encrypted using the public key associated with the administrator controller and inserted in the header or body of the web service request message to enable the administrator controller to decrypt the encrypted telemetry data.

After step 510, the method of flowchart 500 proceeds to step 512. At step 512, the web service request message is transmitted to the administrator controller over the computer network. The web service request message can be transmitted over the computer network using HTTP or HTTPS.

Figure 6:
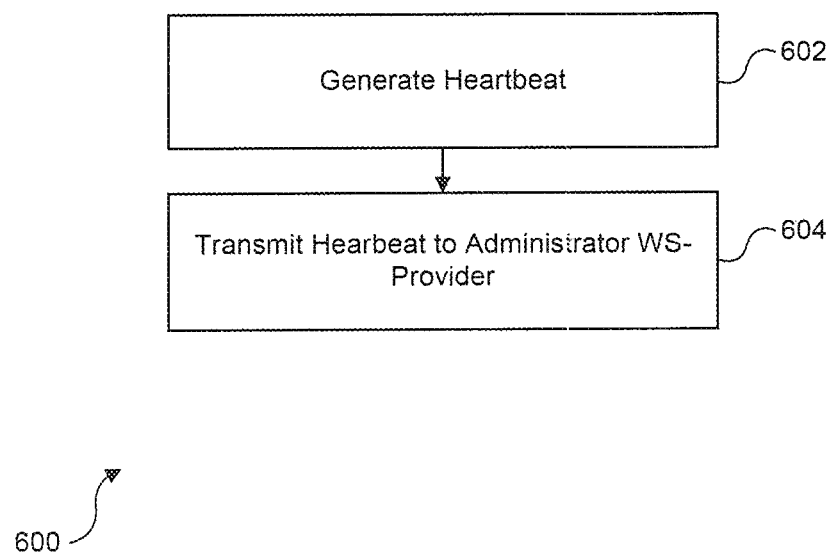
FIG. 6 is a flowchart of a method for generating and transmitting a heartbeat message to an administrator controller over a computer network according to an embodiment of the present disclosure.

Referring now to FIG. 6, a flowchart 600 of a method for generating and transmitting a heartbeat message from a dispenser controller to an administrator controller over a computer network according to an embodiment of the present disclosure is illustrated. The method of flowchart 600 can be implemented by dispenser WS-client 306 or dispenser WS-gateway 402 as described above and illustrated in FIG. 4. However, it should be noted that the method can be implemented by other dispenser WS-clients or dispenser WS-gateways as well.

The method of flowchart 600 begins at step 602. At step 602, a heartbeat message is generated. The heartbeat message can include identifiers, such as hardware identifiers, of the dispenser controller and/or the dispenser machine in which the dispenser controller is implemented.

After step 602, the method of flowchart 600 proceeds to step 604. At step 604, the heartbeat message is sent "out-of-band" over the computer network, such as the internet, to the administrator controller. Messages that are sent "out-of-band" are not signed and/or encrypted at the application level before being sent. The heartbeat messages can be generated and sent periodically or on a recurring basis to signal to the administrator controller that the dispenser controller (or the dispenser machine in which dispenser controller is implemented) exists and is available.

Figure 7:
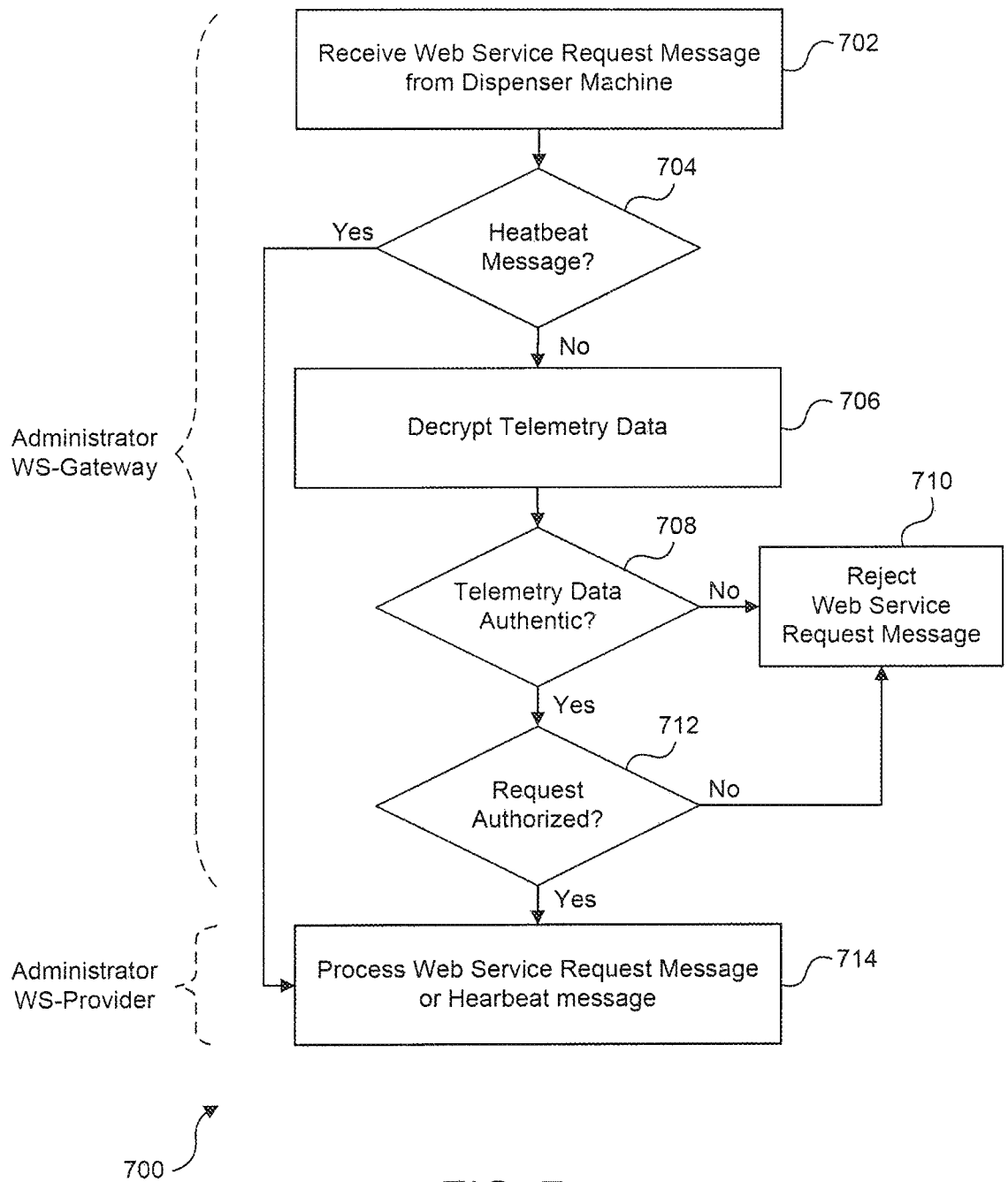
FIG. 7 is a flowchart of a method for securely receiving and processing a web service message containing telemetry data from a dispenser controller according to an embodiment of the present disclosure.

Referring now to FIG. 7, a flowchart 700 of a method for securely receiving and processing a web service request message containing telemetry data from a dispenser controller at an administrator controller according to an embodiment of the present disclosure is illustrated. The method of flowchart 700 can be implemented by administrator WS-gateway 404 and administrator WS-provider 304 as described above and illustrated in FIG. 4. However, it should be noted that the method can be implemented by other administrator WS-gateways and administrator WS-providers as well. The steps of flowchart 700 performed by each of these applications are labeled in FIG. 7. It should be further noted that some of the steps of flowchart 700 do not have to occur in the order shown in FIG. 7.

The method of flowchart 700 begins at step 702. At step 702, a web service request message is received from a dispenser machine over a computer network, such as the internet.

After step 702, the method of flowchart 700 proceeds to step 704. At step 704, the message is inspected to determine whether the message is a heartbeat message. If the message is a heartbeat message, the method of flowchart 700 proceeds to step 714 and the heartbeat message is processed. If the message is not a heartbeat message, the method of flowchart 700 proceeds to step 706.

At step 706, encrypted telemetry data in a body of the web service request message is decrypted. The telemetry data can be decrypted using a private key associated with the administrator controller or using a symmetric key included in a header or the body of the web service request message.

After step 706, the method of flowchart 700 proceeds to step 708. At step 708, the authenticity of the telemetry data is verified. In particular, a digital signature in the header of the web service request message is extracted and decrypted using the public key associated with the dispenser controller. The telemetry data that was signed to create the digital signature can then be compared to the telemetry data in the body of the web service request message to authenticate that the telemetry data came from the dispenser controller. In the instance where the digital signature was created from a one way hash of the telemetry data in the body of the web service request message, the same one way hash of the telemetry data in the body can be performed before comparing the telemetry data in the body to the decrypted digital signature. If the telemetry data is determined to be not authentic based on the comparison (i.e., no match), the method of flowchart 700 proceeds to step 710 where the web service request message is rejected. On the other hand, if the telemetry data is determined to be authentic based on the comparison (i.e., a match), the method of flowchart 700 proceeds to step 712.

At step 712, a determination is made as to whether the dispenser controller is authorized to use the web service to perform the operation (or subroutine) in the web service request message. In one embodiment, a list of dispenser controllers and/or dispensers that are authorized to use the web service subroutine requested in the web service request message is checked. If the dispenser controller or the dispenser in which the dispenser controller is implemented is not on the list, the method of flowchart 700 proceeds to step 710 where the web service request message is rejected. On the other hand, if the dispenser controller or the dispenser in which dispenser controller is implemented is on the list, the method of flowchart 700 proceeds to step 714 where the web service request message is processed (e.g., as described above in regard to FIG. 3).

4. PARALLEL AND SCALABLE PROCESSING OF TELEMETRY DATA

Given that there can be several thousand or even several hundred thousand or more dispenser machines and/or other types of machines connected to an administrator system as described above, and that these machines can all send telemetry data concurrently to the administrator system, there is a further need for the administrator system to be able to receive and quickly process a large number of web service messages. In addition, there is a further need to provide such an administrator system with a throughput that can scale in an efficient manner as machines are connected to or disconnected from the administrator system.

Figure 8:
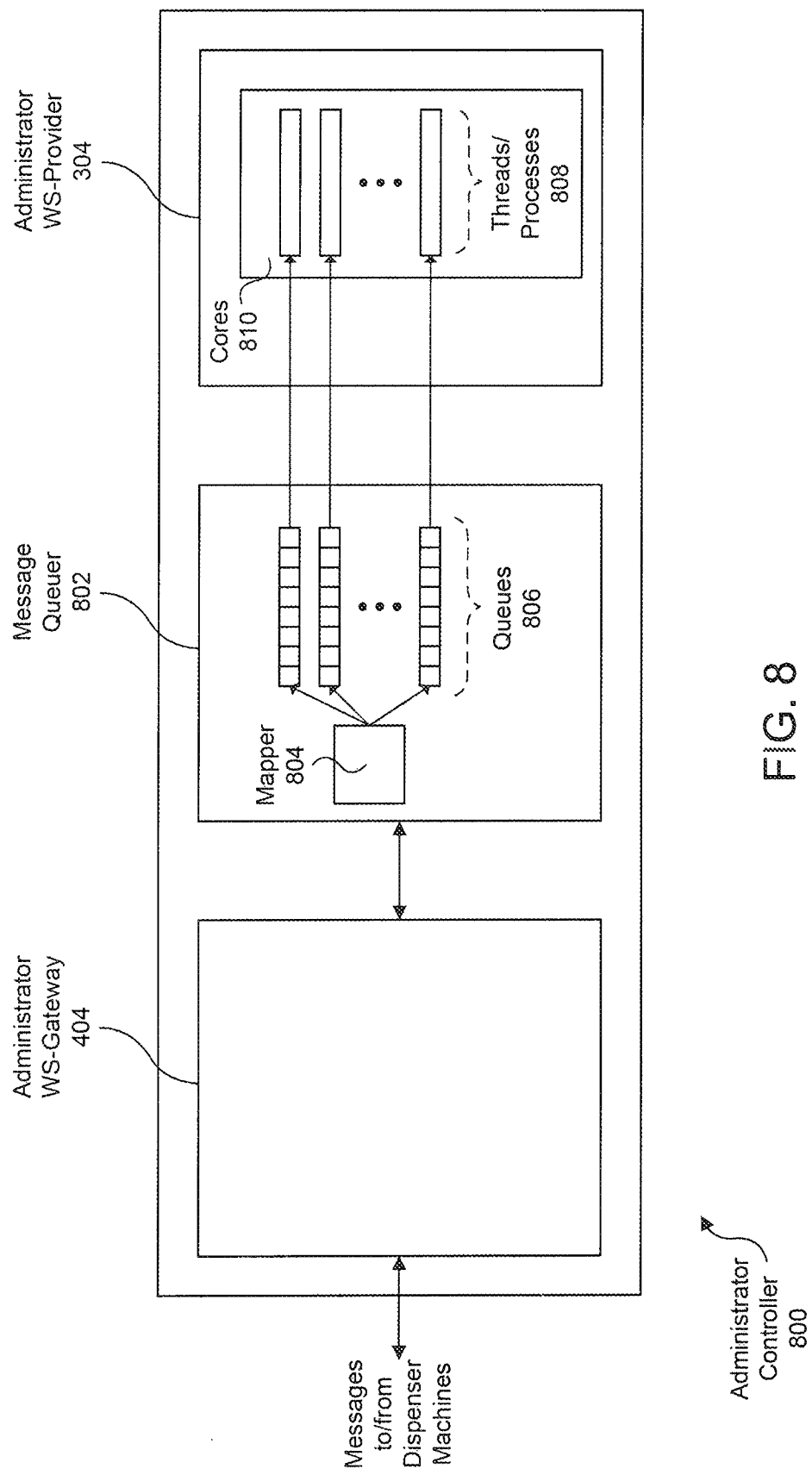
FIG. 8 illustrates an administrator controller for parallel and scalable processing of messages containing telemetry data according to an embodiment of present disclosure.

FIG. 8 illustrates an administrator controller 800 for parallel and scalable processing of messages containing telemetry data according to an embodiment of the present disclosure. Administrator controller 800 has the same basic configuration and operates in the same basic manner as administrator controller 302 in FIG. 4 described above. However, administrator controller 800 further includes a message queuer 802. It should be noted that administrator WS-gateway 404 is an optional component in administrator controller 800.

In operation, web service messages containing telemetry data from dispenser machines are first received and processed by administrator WS-gateway 404 as described above. After being processed by administrator WS-gateway 404, the web service messages are passed to message queuer 802.

Message queuer 802 includes a mapper 804 and a plurality of queues 806. Mapper 804 is configured to map or place each web service message into a respective one of queues 806. Queues 806 are data structures used to store the web service messages in memory.

To process the web service messages stored in queues 806, administrator WS-provider 304 includes a plurality of threads or processes ("threads") 808. A different one of threads 808 can be assigned to each queue 806. Each thread 808 can pull web service messages out of its assigned queue 806 in the order in which the web service messages are stored within the assigned queue 806 and process the telemetry data of the web service messages.

The processing of the telemetry data by threads 808 can include, for example, parsing the telemetry data and populating a database with the various values of the telemetry data. The data in the database can subsequently be used to aid in the distribution of materials (e.g., ingredients) to the dispenser machine and/or in the maintenance of the dispenser machine. In some embodiments, the data in the database can be used to track user preferences and consumption data (e.g., types and amounts of beverages dispensed by the dispenser machine), which can be analyzed to predict consumer trends and/or to support future business decisions as they relate to the dispenser machine. In other embodiments, the data in the database can be used to improve the dispenser machine maintenance task, customer satisfaction, and/or predict parts failure in the dispenser machine and/or schedule preventative maintenance services of the dispenser machine.

Threads 808 can run on central processing unit (CPU) cores 810 or virtual cores at administrator controller 810. Cores 810 can be implemented in or across one or more servers. Based on the number of cores 810, at least some of threads 808 can run in parallel to increase the throughput at which the web service messages are processed. To further increase message processing throughput, the number of cores 810 can be increased and/or the number of queues 806 (and, correspondingly, number of threads 808 assigned to queues 806) can be increased. Such an increase can be made in response to an increase in the number of dispenser machines transmitting web service messages to administrator controller 800.

Mapper 804 can further be configured to ensure that the web service messages are processed in the order in which they are generated at their respective dispenser machines. This may be useful, for example, to ensure decisions related to the maintenance and operation of the dispenser machines are not being made based on old telemetry data or non-chronologically sequenced telemetry data.

To provide such ordered message processing functionality, mapper 804 can place a web service message containing telemetry data into one of queues 806 based on the dispenser machine from which the message was received. For example, mapper 804 can use a dispenser machine identifier included in the web service message to map the web service message to a particular one of queues 806 such that messages from the dispenser machine are placed in the same queue and, therefore, processed by the same thread 808.

The number of queues 806 and the number of threads 808 is typically much less than the number of dispenser machines sending web service messages to administrator controller 800. In such a scenario, mapper 804 can use a hash function to map the web service message to a particular one of queues 806. More specifically, mapper 804 can use the hash function to hash the dispenser machine identifier included in the web service message and use the resulting hash value to assign the web service message to the particular one of queues 806.

Once mapper 804 has determined a particular one of queues 806 in which to place a web service message, mapper 804 can insert the web service message into a particular position of the queue based on when the message was generated at the dispenser machine. For example, mapper 804 can use a message sequence number or time stamp included in the web service message to insert the message at a particular position in the queue such that the web service messages in the queue are stored in the order in which the messages were generated.

Figure 9:
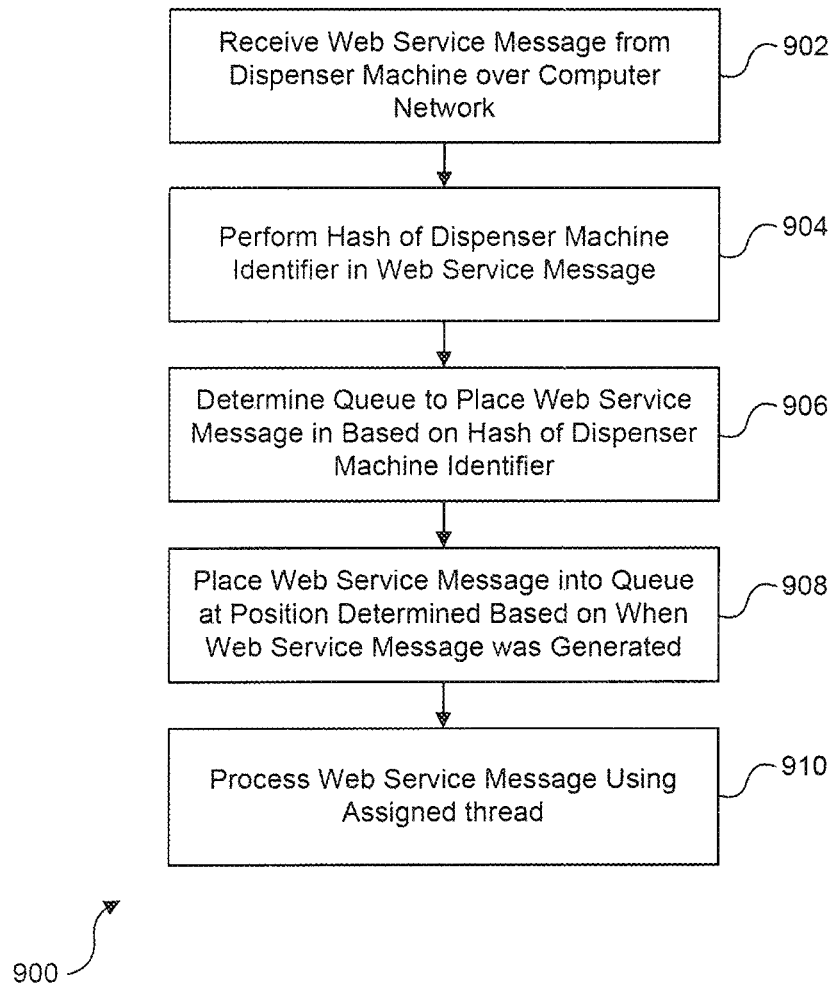
FIG. 9 illustrates a flowchart of a method for receiving and processing web service messages from dispenser machines according to an embodiment of the present disclosure.

Referring now to FIG. 9, a flowchart 900 of a method for receiving and processing web service messages from dispenser machines is illustrated according to an embodiment of the present disclosure. The method of flowchart 900 can be implemented by administrator controller 800 as described above and illustrated in FIG. 8. However, it should be noted that the method can be implemented by other administrator controllers as well. It should be further noted that some of the steps of flowchart 900 are optional and do not have to occur in the order shown in FIG. 9.

The method of flowchart 900 begins at step 902. At step 902, a web service message is received from a dispenser machine over a computer network, such as the internet.

After step 902, the method of flowchart 900 proceeds to step 904. At step 904, a hash of a dispenser machines identifier in the web service message is performed.

After step 904, the method of flowchart 900 proceeds to step 906. At step 906, one of a plurality of queues is identified based on the resulting hash value of the hash of the dispenser machine identifier. Because the same hash value is produced each time for the same dispenser machine identifier, the web service messages received from the dispenser machine will be placed in the same queue.

After step 906, the method of flowchart 900 proceeds to step 908. At step 908, the web service message is placed into the identified queue at a position determined based on when the web service message was generated at the dispenser machine. For example, a message sequence number or time stamp included in the web service message can be used to insert the message at a particular position in the queue such that the web service messages in the queue are stored in the order in which the messages were generated at the dispenser machine.

After step 908, the method of flowchart 900 proceeds to step 910. At step 910, the web service message is processed using one of a plurality of threads assigned to the queue in which the web service message is stored.

5. EXAMPLE COMPUTER SYSTEM IMPLEMENTATION

It will be apparent to persons skilled in the relevant art(s) that various elements and features of the present disclosure, as described herein, can be implemented in hardware using analog and/or digital circuits, in software, through the execution of instructions by one or more general purpose or special-purpose processors, or as a combination of hardware and software.

Figure 10:
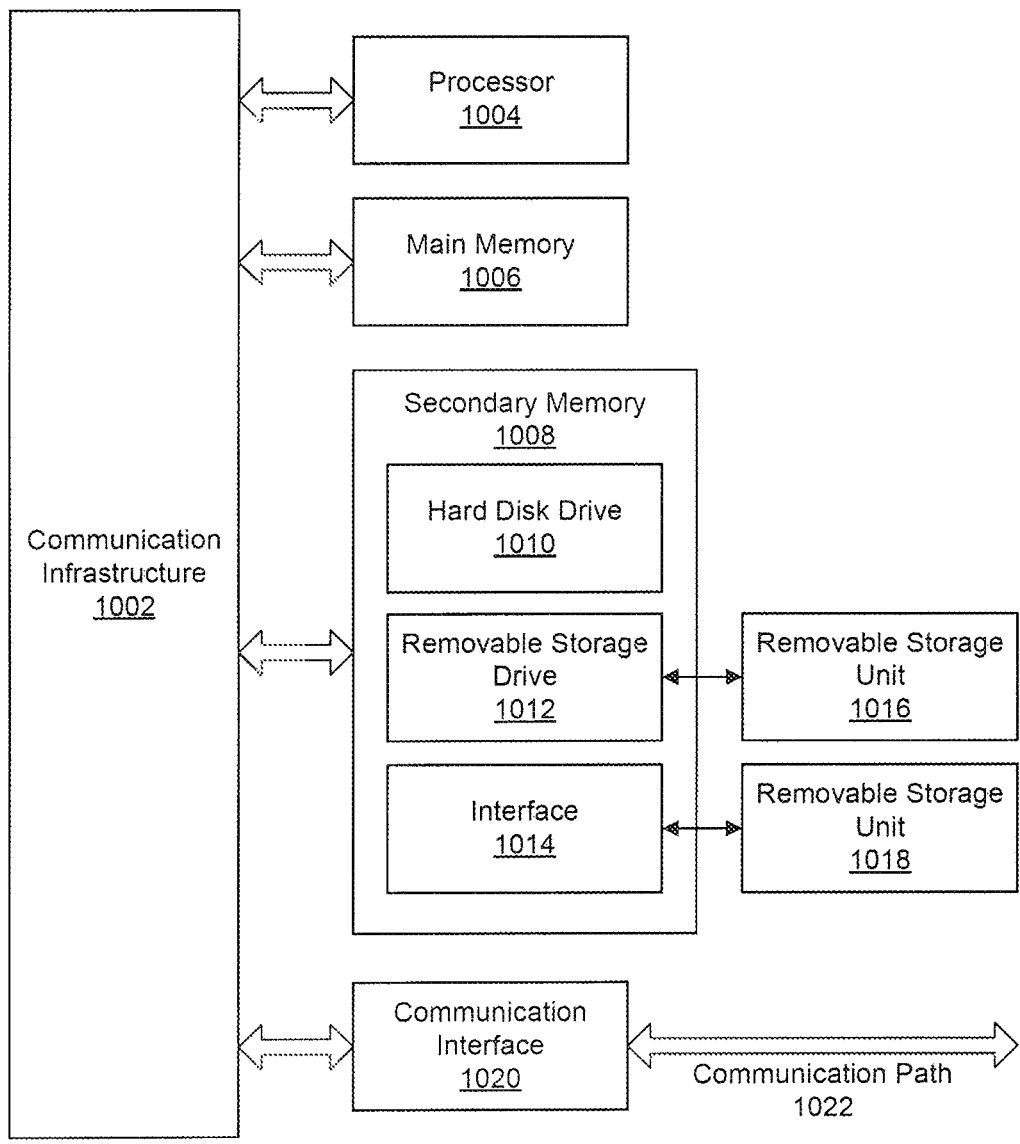
FIG. 10 is a block diagram of an example computer system that can be used to implement aspects of the present disclosure.

The following description of a computer system is provided for the sake of completeness. Embodiments of the present disclosure can be implemented in hardware, or as a combination of software and hardware. Consequently, embodiments of the disclosure may be implemented in the environment of a computer system or other processing system. An example of such a computer system 1000 is shown in FIG. 10. Blocks depicted in FIGS. 3, 4, and 8 may execute on one or more computer systems 1000. Furthermore, each of the steps of the methods depicted in FIGS. 5-7 and 9 can be implemented on one or more computer systems 1000.

Computer system 1000 includes one or more processors, such as processor 1004. Processor 1004 can be a special purpose or a general purpose processor. Processor 1004 is connected to a communication infrastructure 1002 (for example, a bus or network). Various software implementations are described in terms of this exemplary computer system. After reading this description, it will become apparent to a person skilled in the relevant art(s) how to implement the disclosure using other computer systems and/or computer architectures.

Computer system 1000 also includes a main memory 1006 (to store, for example, computer programs or other instructions that implement, at least in part, the blocks depicted in FIGS. 3, 4, and 8 and/or steps in FIGS. 5-7 and 9), preferably random access memory (RAM), and may also include a secondary memory 1008. Secondary memory 1008 may include, for example, a hard disk drive 1010 and/or a removable storage drive 1012, representing a floppy disk drive, a magnetic tape drive, an optical disk drive, or the like. Removable storage drive 1012 reads from and/or writes to a removable storage unit 816 in a well-known manner. Removable storage unit 1016 represents a floppy disk, magnetic tape, optical disk, or the like, which is read by and written to by removable storage drive 1012. As will be appreciated by persons skilled in the relevant art(s), removable storage unit 1016 includes a computer usable storage medium having stored therein computer software and/or data.

In alternative implementations, secondary memory 1008 may include other similar means for allowing computer programs or other instructions (e.g., computer programs or other instructions that implement, at least in part, the blocks depicted in FIGS. 3, 4, and 8 and/or steps in FIGS. 5-7 and 9) to be loaded into computer system 1000. Such means may include, for example, a removable storage unit 1018 and an interface 1014. Examples of such means may include a program cartridge and cartridge interface (such as that found in video game devices), a removable memory chip (such as an EPROM, or PROM) and associated socket, a thumb drive and USB port, and other removable storage units 1018 and interfaces 1014 which allow software and data to be transferred from removable storage unit 1018 to computer system 1000.

Computer system 1000 may also include a communications interface 1020. Communications interface 1020 allows software (e.g., software used to implement the blocks depicted in FIGS. 3, 4, and 8 and/or steps in FIGS. 5-7 and 9) and data to be transferred between computer system 1000 and external devices. Examples of communications interface 1020 may include a modem, a network interface (such as an Ethernet card), a communications port, a PCMCIA slot and card, etc. Software and data transferred via communications interface 1020 are in the form of signals which may be electronic, electromagnetic, optical, or other signals capable of being received by communications interface 1020. These signals are provided to communications interface 820 via a communications path 1022. Communications path 1022 carries signals and may be implemented using wire or cable, fiber optics, a phone line, a cellular phone link, an RF link and other communications channels.

As used herein, the terms "computer program medium" and "computer readable medium" are used to generally refer to tangible storage media such as removable storage units 1016 and 1018 or a hard disk installed in hard disk drive 1010. These computer program products are means for providing software (e.g., software used to implement the blocks depicted in FIGS. 3, 4, and 8 and/or steps in FIGS. 5-7 and 9) to computer system 1000.

Computer programs (also called computer control logic) are stored in main memory 1006 and/or secondary memory 1008. Computer programs may also be received via communications interface 1020. Such computer programs, when executed, enable the computer system 1000 to implement the present disclosure as discussed herein. In particular, the computer programs, when executed, enable processor 1004 to implement the processes of the present disclosure, such as any of the methods described herein. Accordingly, such computer programs represent controllers of the computer system 1000. Where the disclosure is implemented using software, the software may be stored in a computer program product and loaded into computer system 1000 using removable storage drive 1012, interface 1014, or communications interface 1020.

In another embodiment, features of the disclosure are implemented primarily in hardware using, for example, hardware components such as application-specific integrated circuits (ASICs) and gate arrays. Implementation of a hardware state machine so as to perform the functions described herein will also be apparent to persons skilled in the relevant art(s).

6. CONCLUSION

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. An administrator controller comprising:
    an administrator web service gateway configured to:
        receive web service messages over a computer network from dispenser machines;
        determine the web service messages received over the computer network are different than a heartbeat message; and
        decrypt encrypted telemetry data in the web service messages based on the determination that the web service messages are different than the heartbeat message;
    a message queuer comprising:
        a plurality of queues configured to store the web service messages, wherein a number of the plurality of queues is less than a number of the dispenser machines, and
        a mapper configured to place one of the web service messages received over the computer network into one of the plurality of queues based on a dispenser machine from which the web service message is received and based on when the web service message was generated at the dispenser machine relative to other web service messages generated by the dispenser machine in the one of the plurality of queues; and
    an administrator web service provider configured to assign a different one of a plurality of threads to each of the plurality of queues to process the decrypted telemetry data contained in the web service messages stored in the plurality of message queues, wherein the plurality of threads are configured to run on two or more central processing unit (CPU) cores.

2. The administrator controller of claim 1, wherein the mapper is configured to place the web service message received over the computer network into the one of the plurality of queues based on the dispenser machine from which the web service message is received by performing a hash of a dispenser machine identifier in the web service message.

3. The administrator controller of claim 1, wherein a hash value of the hash of the dispenser machine identifier corresponds to the one of the plurality of queues.

4. The administrator controller of claim 1, wherein the plurality of threads are configured to process the decrypted telemetry data contained in the web service messages stored in the plurality of message queues by placing the decrypted telemetry data into a database.

5. The administrator controller of claim 1, wherein the plurality of threads are configured to process the decrypted telemetry data contained in the web service messages stored in the plurality of message queues to aid in distribution of materials to the dispenser machines or in maintenance of the dispenser machines.

6. The administrator controller of claim 1, wherein the dispensing machine dispenses beverages.

7. The administrator controller of claim 1, wherein the computer network is the internet.

8. A method comprising:
receiving web service messages over a computer network from dispenser machines;
determining the web service messages received over the computer network are different than a heartbeat message;
decrypting encrypted telemetry data in the web service messages based on the determination that the web service messages are different than the heartbeat message;
placing a web service message received over the computer network into one of a plurality of queues based on a dispenser machine from which the web service message is received and based on when the web service message was generated at the dispenser machine relative to other web service messages generated by the dispenser machine in the one of the plurality of queues; and
assigning a different one of a plurality of threads to each of the plurality of queues to process the decrypted telemetry data contained in the web service messages in the plurality of message queues,
wherein the plurality of threads are configured to run on two or more central processing unit (CPU) cores.

9. The method of claim 8, wherein placing the web service message received over the computer network into the one of the plurality of queues based on the dispenser machine from which the web service message is received comprises:
performing a hash of a dispenser machine identifier in the web service message.

10. The method of claim 8, wherein a hash value of the hash of the dispenser machine identifier corresponds to the one of the plurality of queues.

11. The method of claim 8, wherein the plurality of threads are configured to process the decrypted telemetry data contained in the web service messages in the plurality of message queues by placing the decrypted telemetry data into a database.

12. The method of claim 8, wherein the plurality of threads are configured to process the decrypted telemetry data contained in the web service messages in the plurality of message queues to aid in distribution of materials to dispenser machines or in maintenance of the dispenser machines.

13. The method of claim 8, wherein the dispensing machine dispenses beverages.

14. The method of claim 8, wherein the computer network is the internet.

15. An administrator controller comprising:
an administrator web service gateway configured to:
receive web service messages over a computer network from dispenser machines;
determine the web service messages received over the computer network are different than a heartbeat message; and
decrypt encrypted telemetry data in the web service messages based on the determination that the web service messages are different than the heartbeat message;
a message queuer comprising:
a plurality of queues configured to store web service messages, and
a mapper configured to place one of the web service messages received over the computer network into one of the plurality of queues based on a dispenser machine from which the web service message is received and based on when the web service message was generated at the dispenser machine relative to other web service messages generated by the dispenser machine in the one of the plurality of queues; and
an administrator web service provider configured to assign a different one of a plurality of threads to each of the plurality of queues to process the decrypted telemetry data contained in web service messages stored in the plurality of message queues, wherein the plurality of threads are configured to run on two or more central processing unit (CPU) cores.

16. The administrator controller of claim 15, wherein the mapper is configured to place the web service message received over the computer network into the one of the plurality of queues based on the dispenser machine from which the web service message is received by performing a hash of a dispenser machine identifier in the web service message.

17. The administrator controller of claim 15, wherein a hash value of the hash of the dispenser machine identifier corresponds to the one of the plurality of queues.

18. The administrator controller of claim 15, wherein the plurality of threads are configured to process the decrypted telemetry data contained in the web service messages stored in the plurality of message queues by placing the decrypted telemetry data into a database.

19. The administrator controller of claim 15, wherein the plurality of threads are configured to process the decrypted telemetry data contained in the web service messages stored in the plurality of message queues to aid in distribution of materials to the dispenser machines or in maintenance of the dispenser machines.

* * * * *